United States Patent [19]
Ishizaka

[11] Patent Number: 6,002,510
[45] Date of Patent: Dec. 14, 1999

[54] DRIVING APPARATUS FOR OPTICAL MODULATOR AND DRIVING APPARATUS FOR MODULATOR INTEGRATED LIGHT SOURCE

[75] Inventor: Masashige Ishizaka, Tokyo, Japan

[73] Assignee: NEC Corporation, Tokyo, Japan

[21] Appl. No.: 09/061,170

[22] Filed: Apr. 16, 1998

[30] Foreign Application Priority Data

Apr. 18, 1997 [JP] Japan ................................ 9-101898

[51] Int. Cl.⁶ .................................................. B02F 1/015
[52] U.S. Cl. ......................... 359/248; 359/173; 359/181
[58] Field of Search ................... 359/247, 248, 359/249, 180, 181, 187, 154, 161, 173

[56] References Cited

U.S. PATENT DOCUMENTS

| 5,546,218 | 8/1996 | Komatsubara et al. | 359/237 |
| 5,706,116 | 1/1998 | Sugata | 359/180 |
| 5,706,117 | 1/1998 | Imai et al. | 359/187 |

FOREIGN PATENT DOCUMENTS

| 2-52312 | 2/1990 | Japan . |
| 6-160918 | 6/1994 | Japan . |
| 7-64031 | 3/1995 | Japan . |
| 8-307359 | 11/1996 | Japan . |
| 10-013351 | 1/1998 | Japan . |

OTHER PUBLICATIONS

By Morito et al., Collection of Lecture Papers of the Meeting in 1995 of the "Electronics Society of the Electronic Information Communication Society of Japan", Separate vol. 1, p. 301 (Lecture Number: C–301.

*Primary Examiner*—Scott J. Sugarman
*Assistant Examiner*—Margaret Burke
*Attorney, Agent, or Firm*—Young & Thompson

[57] ABSTRACT

A driving apparatus for causing an optical modulator to output modulated light, which has a PIN structure composed of a buffer layer, a light absorption layer and a clad layer and wherein an absorbed amount of light waves inputted to the light absorption layer varies in response to an applied voltage applied in the reverse direction to the PIN structure, includes a voltage waveform converter for deforming an input signal waveform so as to correct the non-linear characteristics of the absorbed amount with respect to the applied voltage of the optical modulator or a level shifting circuit for shifting a voltage level of the input signal to a forward voltage side to the PIN structure within a built-in voltage to correct the displacement of a cross point of an eye pattern of modulated output light outputted from the optical modulator of the electrical field absorption type.

18 Claims, 9 Drawing Sheets

DRIVING APPARATUS FOR OPTICAL MODULATOR AND DRIVING APPARATUS FOR MODULATOR INTEGRATED LIGHT SOURCE

BACKGROUND OF THE INVENTION

1. Field of the Invention

This invention relates to a driving apparatus for an optical modulator of the electrical field absorption type for use with an optical communication system or an optical information processing system and a driving apparatus for a modulator integrated light source wherein the optical modulator is integrated together with a light source, and more particularly to a driving apparatus for an optical modulator and a driving apparatus for a modulator integrated light source by which a good eye pattern is obtained with modulated output light.

2. Description of the Related Art

In recent years, as the speed and the distance of communication of an optical communication system increase, drawbacks of a direct modulation method for a semiconductor laser which has conventionally been used are becoming a reality. The direct modulation method is a technique for outputting modulated light directly from a semiconductor laser and has a problem in that so-called wavelength chirping occurs wherein the oscillation wavelength varies transiently upon modulation and deteriorates the transmission waveform in an optical fiber. This phenomenon appears more conspicuously as the transmission speed of a signal increases and as the transmission distance increases, and becomes a serious problem particularly with an optical communication system which employs an existing 1.3 $\mu$m zero dispersion normal fiber. Further, if wavelength chirping occurs, even if it is tried to increase the transmission distance using a light source of the wavelength 1.55 $\mu$m band with which the fiber propagation loss is comparatively low, the transmission distance is limited by a dispersion of the fiber (a phenomenon that occurs become the refractive index of the fiber is different between different wavelengths, that is, the propagation velocity is different between different wavelengths).

However, the problems which arise from wavelength chirping can be reduced by adopting an external modulation method wherein a semiconductor laser is driven to emit light with a fixed power and the light is modulated using an optical modulator separate from the semiconductor laser.

While known optical modulators used in the external modulation method employ a dielectric such as $LiNbO_3$ or a semiconductor such as InP or G&aAs, expectations are increasing for optical semiconductors made of a semiconductor which can be integrated together with another optical element such as a semiconductor laser or an optical amplifier or with an electronic circuit element such as an FET and can be formed in a small size and operate with a low voltage.

Available as optical modulators which employ a semiconductor are optical modulators of the electrical field absorption type (hereinafter referred to as electrical field absorption type optical modulators) which effect optical intensity modulation making use of an effect that the absorption wavelength of light is shifted to the longer wavelength side (the light absorption coefficient is varied) by an applied voltage such as a Franz-Keldysh effect of a bulk semiconductor and a quantum confined Stark effect of a multi quantum well structure and optical modulators of the Mach-Zehnder type which make use of a variation in refractive index caused by a Pockels effect or a quantum confined Stark effect of a bulk semiconductor.

With the optical modulator of the Mach-Zehnder type, wavelength chirping can be reduced to zero in principle. However, since it has a structure of the interference type and does not have a structure which has such a simple linear waveguide as in the electrical field absorption type optical modulator, it is complicated in methods of producing and driving the same.

On the other hand, while the electrical field absorption type optical modulator provides a much smaller amount of wavelength chirping than that of the direct modulation method of a semiconductor laser, it cannot still reduce the wavelength chirping to zero. However, a pre-bias application method has been proposed recently wherein a fixed voltage is applied to the electrical field absorption type optical modulator and a signal is superposed on the fixed voltage. It has been confirmed that the pre-bias application method can reduce wavelength chirping of an optical modulator to raise the dispersion withstanding property of an optical fiber with respect to laser light of the 1.55 $\mu$m band and overcome the limitation to the transmission distance by the dispersion.

As an example of the type described, a device wherein a DFB (distributed feedback) laser and the electrical field absorption type optical modulator are integrated is reported in Morito et al., Collection of Lecture Papers of the Meeting in 1995 of the Electronics Society of the Electronic Information Communication Society of Japan, Separate Volume 1, p.301 (Lecture Number: C-301).

In this report, a fixed pre-bias (−1.1 V) is applied in advance to the electrical field absorption type optical modulator to increase the dispersion withstanding property of an optical fiber to achieve data transmission of 100 km at 10 Gb/s. In this manner, while the electrical field absorption type optical modulator has a structure which includes a simple linear waveguide, also in regard to reduction of the wavelength chirping, it has been or is being improved to such a degree that it has a performance higher than the other optical wavelengths.

Figure 1:
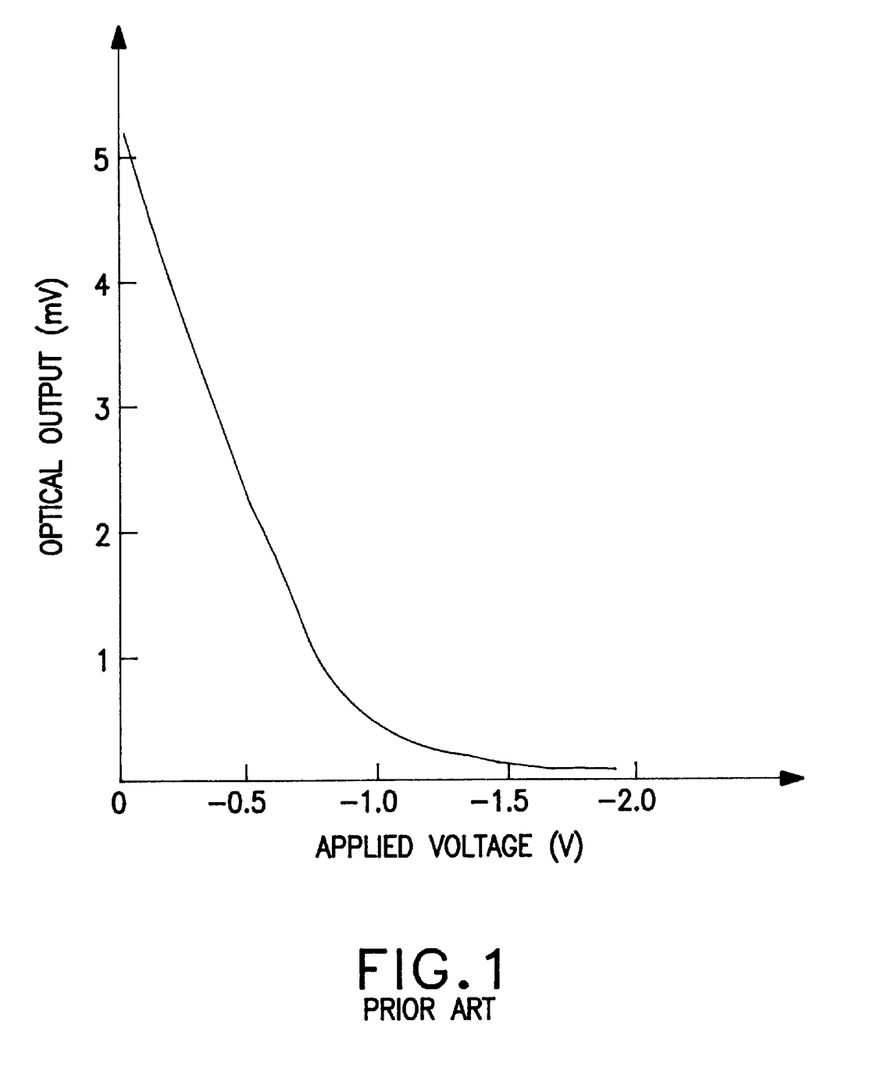
FIG. 1 is a graph of the quenching characteristics illustrating a relationship of an optical output with respect to an applied voltage of an optical modulator of the electrical field absorption type.
Figure 2:
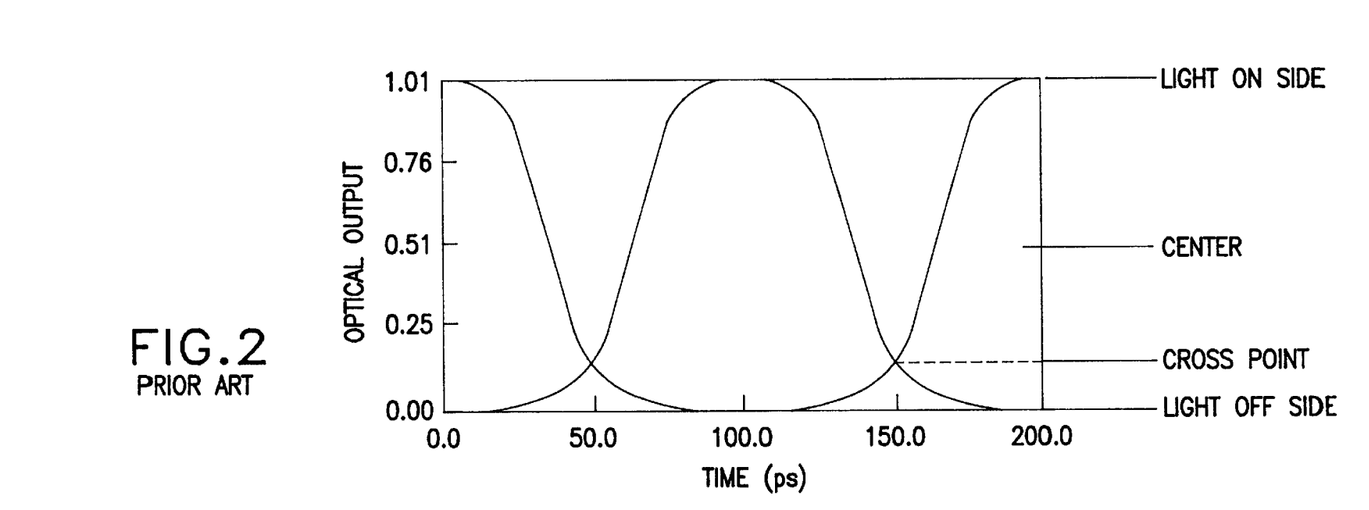
FIG. 2 is a waveform diagram illustrating an eye pattern of conventional modulated output light outputted from an optical modulator.

However, in such conventional electrical field absorption type optical modulators as described above, since the relationship of the output power (optical output) to the applied voltage is not linear as seen from FIG. 1, a cross point of an eye pattern of modulated output light outputted from the optical modulator is displaced to the lower side (OFF side of light) from the center as seen in FIG. 2, and there is a problem in that, because of the displacement of a cross point, an eye mask specification required for an optical communication system is not satisfied.

More particularly, since the relationship (hereinafter referred to as quenching characteristics) of the absorbed light amount with respect to the applied voltage of the electrical field absorption type optical modulator presents a smooth curve which exhibits a comparatively linear increase with a low applied voltage and soon exhibits a gradual saturation, a cross point of an eye pattern is displaced to the lower side (OFF side of light) from the center by the non-linear quenching characteristics.

In order to solve this problem, it is necessary to either devise the structure of the electrical field absorption type optical modulator to change the non-linear quenching characteristics to a linear characteristics or devise the driving apparatus to convert the non-linear quenching characteristics into an apparently linear quenching characteristics.

SUMMARY OF THE INVENTION

Accordingly, it is an object of the present invention to provide a driving apparatus for an optical modulator and a driving apparatus for a modulator integrated light source by which displacement of a cross point of an eye pattern of modulated output light outputted from an optical modulator of the electrical field absorption type can be corrected.

In order to attain the object described above, according to an aspect of the present invention, there is provided a driving apparatus for causing the optical modulator to output modulated light, the optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in the light absorption layer are successively layered on a semiconductor substrate such that an absorbed amount of the light waves inputted to the light absorption layer varies in response to an applied voltage applied in the reverse direction to the PIN structure, the driving apparatus comprising a voltage waveform converter for deforming a signal waveform inputted thereto so as to correct the non-linear characteristics of the absorbed amount with respect to the applied voltage of the optical modulator and outputting the deformed signal waveform to the optical modulator, or a level shifting circuit for shifting a voltage level of a signal inputted thereto to a forward voltage side to the PIN structure within a built-in voltage.

According to another aspect of the present invention, there is provided a driving apparatus for causing the modulator integrated light source to output modulated light, the modulator integrated light source including an optical modulator having a PIN structure wherein a buffer layer made of an n-type semiconductor, a light absorption layer for absorption light waves inputted from one end thereof and outputting the remaining light waves from the other end thereof, and a clad layer made of a p-type semiconductor for confining the light waves in the light absorption layer are successively layered on a semiconductor substrate such that an absorbed amount of the light waves inputted to the light absorption layer varies in response to an applied voltage applied in the reverse direction to the PIN structure, and a semiconductor laser formed on the semiconductor substrate and serving as a light source for the light waves to be inputted to the optical modulator, the driving apparatus comprising a voltage waveform converter for deforming a signal waveform inputted thereto so as to correct the non-liner characteristics of the absorbed amount with respect to the applied voltage of the optical modulator and outputting the deformed signal waveform to the optical modulator, or a level shifting circuit for shifting a voltage level of a signal inputted thereto to a forward voltage side to the PIN structure within a built-in voltage.

Preferably, the level shifting circuit is a bias Tee circuit which includes a variable voltage source for variably outputting a dc voltage for determining a shift amount, a capacitor for preventing a dc component outputted from the variable voltage source from having an influence on a signal source which outputs the signal, and an inductance for preventing an ac component outputted from the signal source from having an influence on the variable voltage source.

With the driving apparatus for the optical modulator and the driving apparatus for the modulator integrated light source constructed in such a manner as described above, since the signal waveform is deformed so as to correct the non-linear characteristics of the absorbed amount with respect to the applied voltage of the optical modulator by means of the voltage waveform converter, the modulated light is outputted with a linear characteristics from the optical modulator, and displacement of a cross point of an eye pattern of the modulated light output is corrected.

Further, since the quenching characteristics, which is a characteristics of the absorbed light amount with respect to the applied voltage of the optical modulator, presents a smooth curve which exhibits a comparatively linear increase with a low applied voltage and soon exhibits a gradual saturation, modulated light corresponding to the voltage waveform of the signal in a comparatively linear portion of the quenching characteristics of the optical modulator is outputted by shifting the voltage level of the signal to the forward voltage side to the PIN structure within the built-in voltage. Consequently, the modulated light is outputted with substantially linear characteristics from the optical modulator, and displacement of a cross point of an eye pattern of the modulated output light is corrected.

The above and other objects, features and advantages of the present invention will become apparent from the following description with reference to the accompanying drawings which illustrate examples of the present invention.

DETAILED DESCRIPTION OF THE PREFERRED EMBODIMENTS

In the following, the present invention is described with reference to the drawings.

(First Embodiment)

First, a first embodiment of the present invention is described with reference to FIGS. 3 and 4A to 4D.

Figure 3:
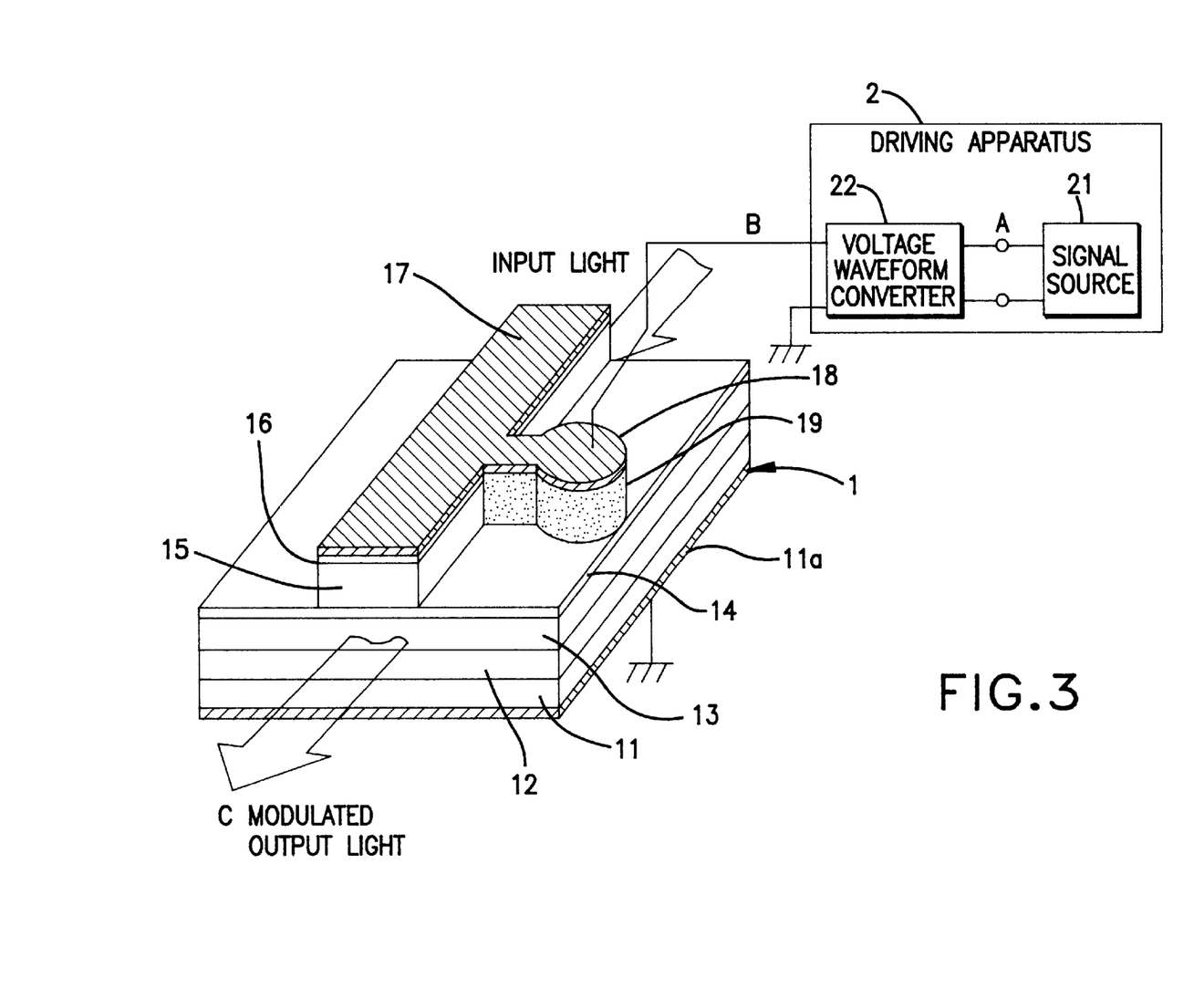
FIG. 3 shows a construction of a first embodiment of a driving apparatus for an optical modulator of the present invention and is a perspective view showing a structure of the optical modulator and a block diagram showing the construction of the driving apparatus.

It is to be noted that the optical modulator shown in FIG. 3 is the electrical field absorption type optical modulator having a multi quantum well (MQW) structure of the InP type.

First, the structure of optical modulator 1 shown in FIG. 3 is described.

Referring to FIG. 3, on the entire surface of n-InP substrate 11 of the (100) crystal orientation which form optical modulator 1, n-InP buffer layer 12 (film thickness: 0.8 $\mu$m, carrier concentration: $1 \times 10^{17}$ cm$^{-3}$) is layered, and MQW light absorption layer 13 (InGaAsP/InGaAsP eight periods: absorption end wavelength $\lambda$g1=1.48 $\mu$m, carrier concentration=$5 \times 10^{15}$ cm$^{-3}$) and i-InP clad layer 14 (film thickness: 1,600 Å) for adjusting the guided wave mode of the optical waveguide (MQW light absorption layer 13) are successively layered on the entire surface of n-InP buffer layer 12.

Further, p-InP clad layer 15 (film thickness: 1.5 $\mu$m, carrier concentration: $5 \times 10^{17}$ cm$^{-3}$) for confining input light in a horizontal direction and p-InGaAs cap layer 16 (film thickness: 0.2 $\mu$m, carrier concentration: $1 \times 10^{19}$ cm$^{-3}$) serving as a buffer layer between p-InP clad layer 15 and a p-side electrode which will be described below are successively layered on i-InP clad layer 14, and further, p-side electrode 17 made of Cr/Au is formed on p-InGaAs cap layer 16.

Pad electrode 18 is connected to p-side electrode 17, and polyimide film 19 serving as an insulating layer is formed below pad electrode 18. Further, n-side electrode 11a made of Cr/Au is formed on the rear surface of n-InP substrate 11. It is to be noted that a non-reflective coating film is applied to cleavage end surfaces of optical modulator 1 which serve as an input surface of light and an output surface of modulated light.

Meanwhile, driving apparatus 2 includes signal source 21 for outputting a pulse signal as a modulation signal, and voltage waveform converter 22 for deforming a signal voltage waveform outputted from signal source 21. A signal outputted from voltage waveform converter 22 is applied between pad electrode 18 and n-side electrode 11a of optical modulator 1.

Optical modulator 1 of the electrical field absorption type having the construction described above outputs light with such quenching characteristics as illustrated in FIG. 1 when a reverse voltage is applied to the PIN structure of optical modulator 1. Meanwhile, voltage waveform converter 22 deforms the signal voltage waveform so as to correct the non-linearity of the quenching characteristics of optical modulator 1.

In other words, voltage waveform converter 22 is formed from a circuit which deforms signal voltage V0 to V≈f$^{-1}$(C×V0) with respect to a relationship $\alpha$=f(V) of applied voltage V to absorption loss (absorption amount) $\alpha$ of optical modulator 1 (C: constant).

Figure 4A:
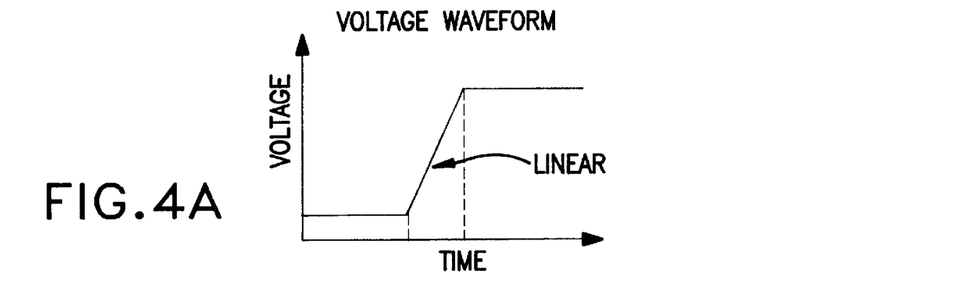
FIG. 4A illustrates a manner of operation of the driving apparatus for the optical modulator shown in FIG. 3 and is a waveform diagram showing an input waveform of a voltage waveform converter.
Figure 4B:
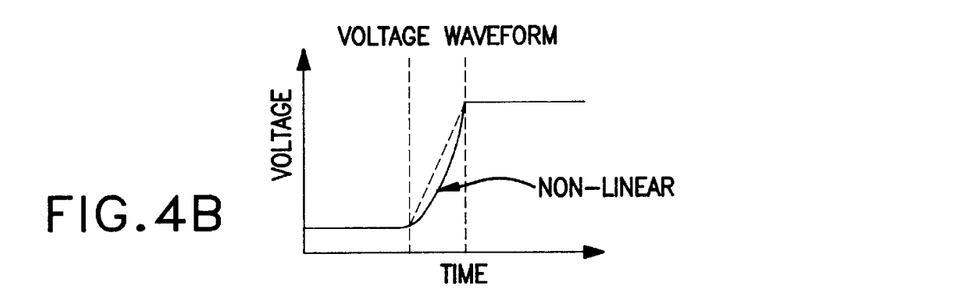
FIG. 4B illustrates another manner of operation of the driving apparatus for the optical modulator shown in FIG. 3 and is a waveform diagram showing an output waveform of the voltage waveform converter.
Figure 4C:
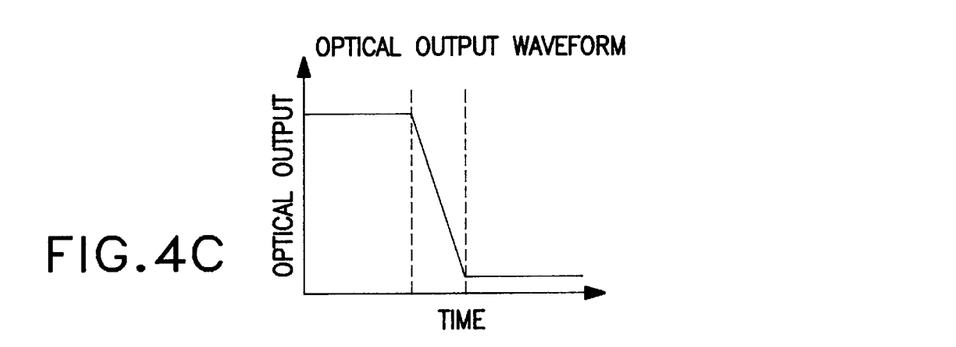
FIG. 4C shows a further manner of operation of the driving apparatus for the optical modulator shown in FIG. 3 and is a waveform diagram showing an optical output waveform of the optical modulator.
Figure 4D:
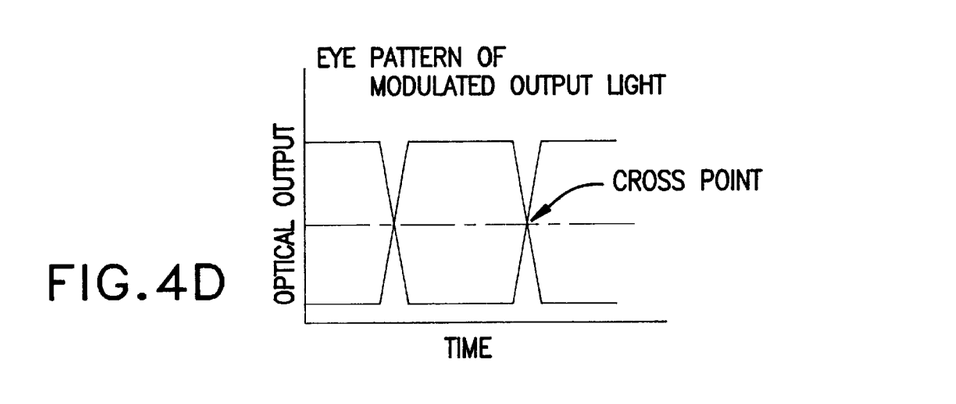
FIG. 4D shows a still further manner of operation of the driving apparatus for the optical modulator shown in FIG. 3 and is a waveform diagram showing an eye pattern of modulated output light.

Here, if a linear signal voltage waveform is outputted from signal source 21 as seen in FIG. 4A, then voltage waveform converter 22 deforms the signal voltage waveform outputted from signal source 21 so as to correct the non-linearity of the quenching characteristics of optical modulator 1 (refer to FIG. 4B). Accordingly, from optical modulator 1, linear modulated light which corresponds to the signal voltage waveform is outputted (refer to FIG. 4C), and a good eye pattern of modulated output light with displacement of a cross point thereof corrected can be obtained as seen in FIG. 4D.

(Second Embodiment)

In the following, a second embodiment of the present invention is described with reference to FIGS. 5, 6A to 6C and 7A and 7B.

Figure 5:
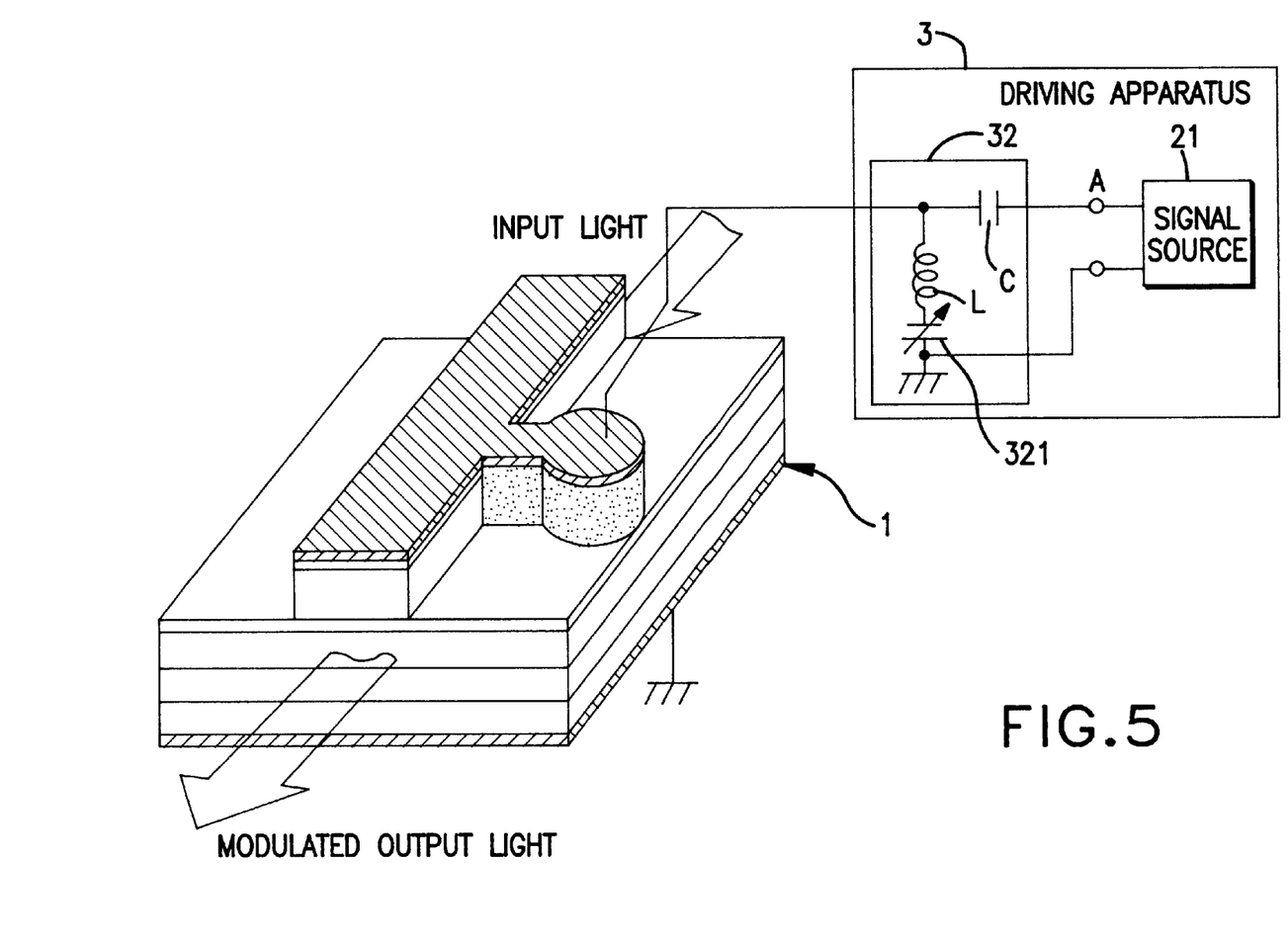
FIG. 5 shows a construction of a second embodiment of a driving apparatus for an optical modulator of the present invention and is a perspective view showing a structure of the optical modulator and a block diagram showing the construction of the driving apparatus.

It is to be noted that, since optical modulator 1 of the present embodiment is an optical modulator of the electrical field absorption type having an InP type multi quantum well (MQW) structure similarly as in the first embodiment, detailed description of the same is omitted.

Referring to FIG. 5, driving apparatus 3 of the present embodiment includes signal source 31 for outputting a pulse signal as a modulation signal, and bias Tee circuit 32 for shifting the level of the signal voltage outputted from signal source 31 to the forward voltage side of optical modulator 1. Bias Tee circuit 32 includes variable voltage source 321 for outputting a dc voltage for determining a level shift amount of the signal voltage into the forward voltage region, capacitor C for preventing a dc component outputted from variable voltage source 321 from having an influence on signal source 31, and inductance L for preventing ac components outputted from signal source 31 from having an influence on variable voltage source 321. A signal outputted from bias Tee circuit 32 is applied between a pad electrode and an n-side electrode of optical modulator 1.

Figure 6A:
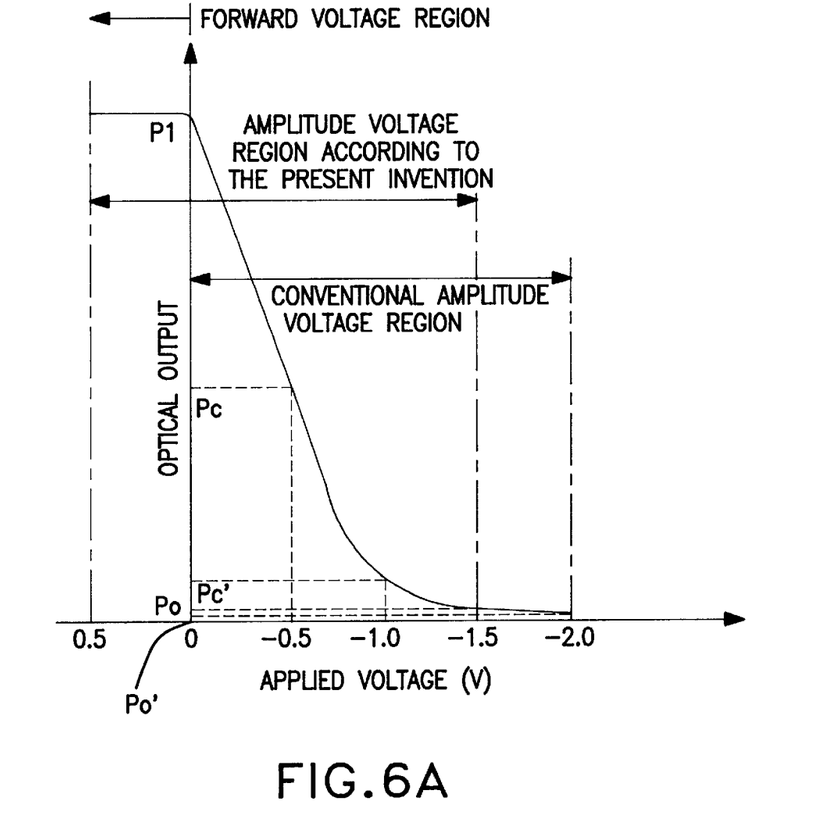
FIG. 6A illustrates a manner of operation of the optical modulator shown in FIG. 5 and is a graph illustrating the quenching characteristics of the optical modulator for explaining an operation principle.
Figure 6B:
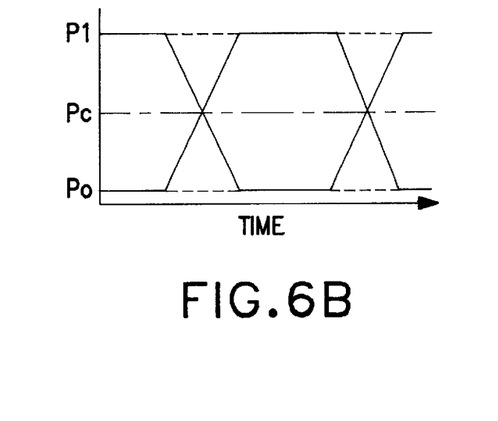
FIG. 6B illustrates another manner of operation of the optical modulator shown in FIG. 5 and is a waveform diagram showing an eye pattern of modulated output light.

In driving apparatus 3 having the construction described above, the voltage level shift amount of bias Tee circuit 32 is limited within a built-in voltage of optical modulator 1. This is because, if a voltage higher than the built-in voltage is applied as a bias voltage to optical modulator 1, then forward current flows through optical modulator 1 and this gives rise to the possibility that problems of conspicuous chirping and so forth may be caused thereby. The built-in voltage of optical modulator 1 of the present embodiment is 0.7 V, and as seen in FIG. 6A, in the present embodiment, the signal voltage is biased by 0.5 V to the forward voltage side or region of optical modulator 1 by bias Tee circuit 32.

By the countermeasure described, optical output $P_C$ of optical modulator 1 which corresponds to the center of the amplitude (−0.5 V) of the signal voltage exhibits a value substantially at the center between maximum optical output $P_1$ (power when light is ON) and minimum optical output $P_0$ (power when light is OFF). Accordingly, since a cross point of an eye pattern of the modulated output light becomes substantially equal to an optical output corresponding to the amplitude center of the signal voltage, displacement of a cross point is corrected.

Figure 6C:
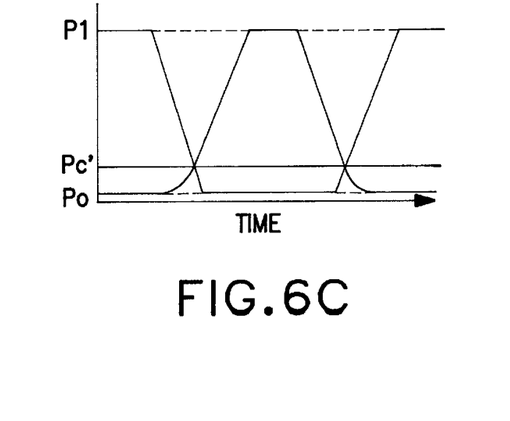
FIG. 6C illustrates a further manner of operation of the optical modulator shown in FIG. 5 and is a waveform diagram showing a different eye pattern of modulated output light.
Figure 7A:
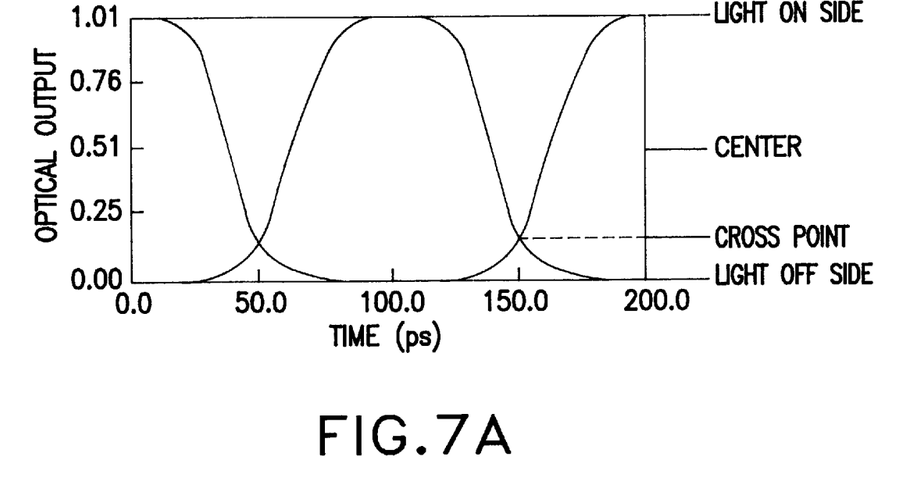
FIG. 7A illustrates a manner in which an eye pattern of modulated output light of the optical modulator shown in FIG. 5 is improved and is a waveform diagram before the improvement.
Figure 7B:
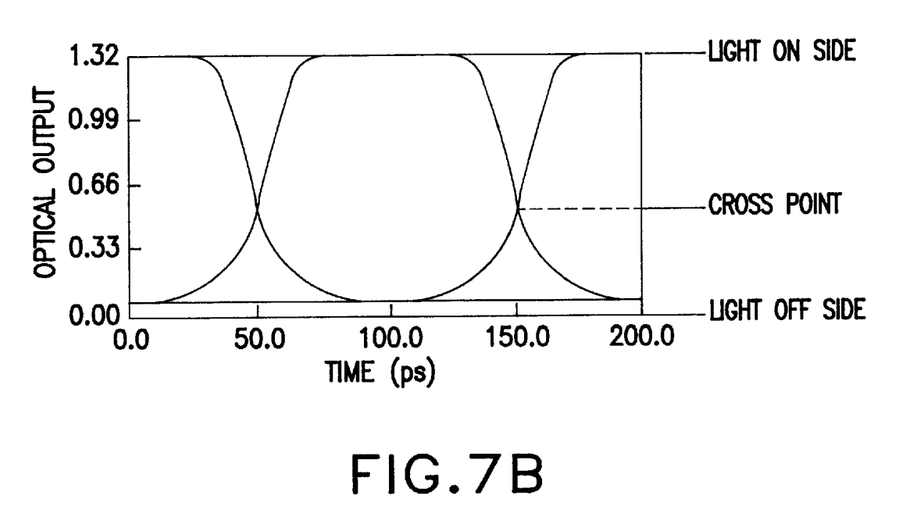
FIG. 7B illustrates the manner in which an eye pattern of modulated output light of the optical modulator shown in FIG. 5 is improved and is a waveform diagram after the improvement.

On the other hand, when the signal voltage is not biased by bias Tee circuit 32, power $P_C'$ of the optical output corresponding to the amplitude center (−1.0 V) of the signal voltage has a value displaced to the lower side of an eye pattern (OFF side of light) as seen in FIG. 6C.

Accordingly, since displacement (refer to FIG. 7A) of a cross point of an eye pattern of modulated output light can be corrected by the driving apparatus for an optical modulator of the present embodiment in a similar manner as in the first embodiment, a good eye pattern can be obtained. Further, in this instance, the signal voltage can be biased with such a simple construction as that of bias Tee circuit 32.

(Third Embodiment)

In the following, a third embodiment of the present invention is described with reference to FIG. 8.

In the present embodiment, an optical modulator module for optical communication on which the optical modulator and the driving apparatus described in the first or second embodiment is described.

Figure 8:
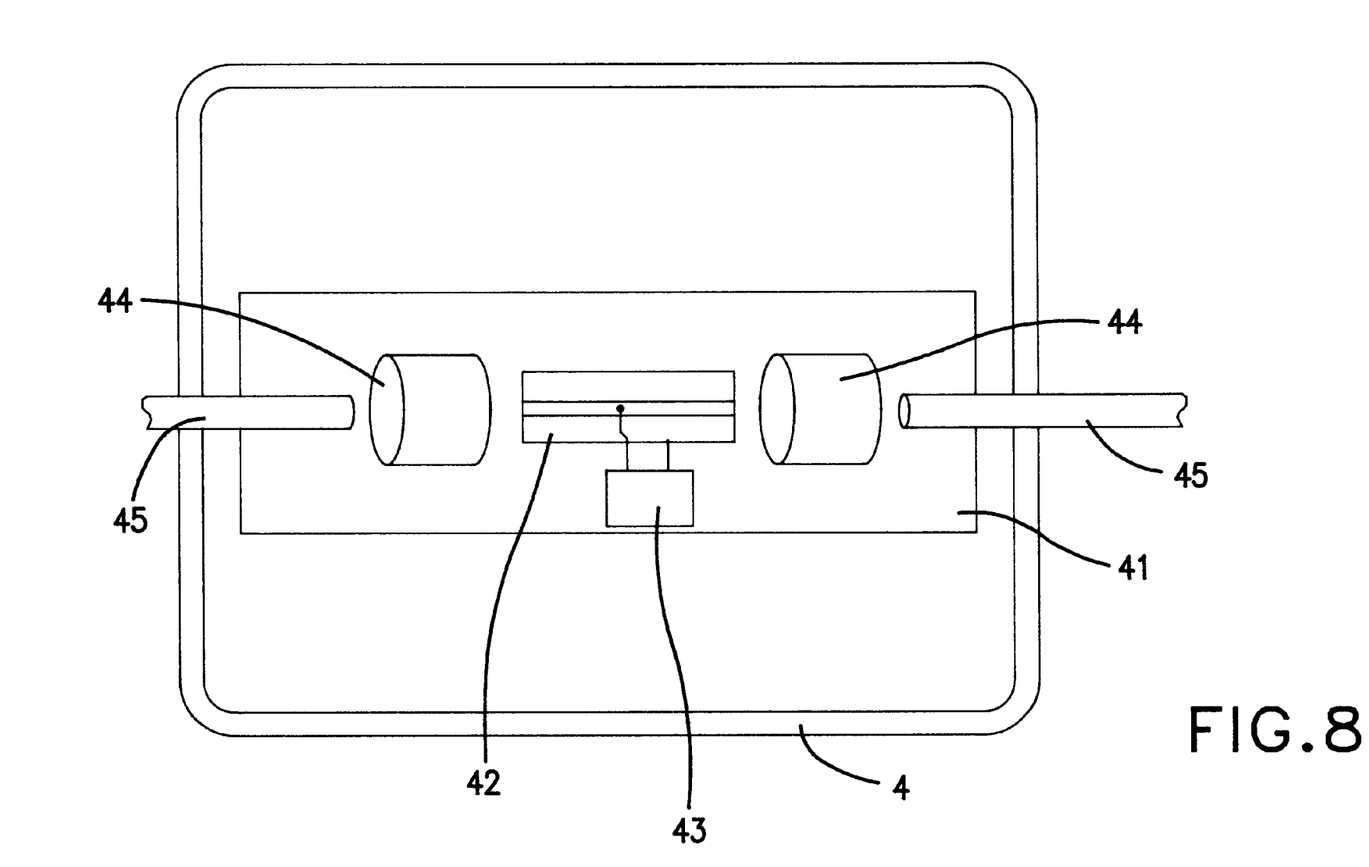
FIG. 8 is a plan view showing an example of a construction of an optical modulator module on which the optical modulator and the driving apparatus shown in FIG. 3 or FIG. 5 are mounted.

Referring to FIG. 8, optical modulator module 4 for optical communication includes sub-mount 41 for securing optical modulator 42 and driving apparatus 43, and optical modulator 42 of the electrical field absorption type described in the first or second embodiment is secured to sub-mount 41. Optical fiber 45 is secured on an optical axis of optical modulator 42 with aspherical lens 44 interposed therebetween. Driving apparatus 43 is secured in the proximity of optical modulator 42 and connected to the pad electrode and the n-side electrode of optical modulator 42.

Where optical modulator module 4 described in the present embodiment having the construction described above is used, a good optical output eye pattern can be readily produced.

(Fourth Embodiment)

In the following, a fourth embodiment of the present invention is described with reference to FIG. 9.

In the present embodiment, an optical communication system which employs the optical modulator module described in the third embodiment is described.

Figure 9:
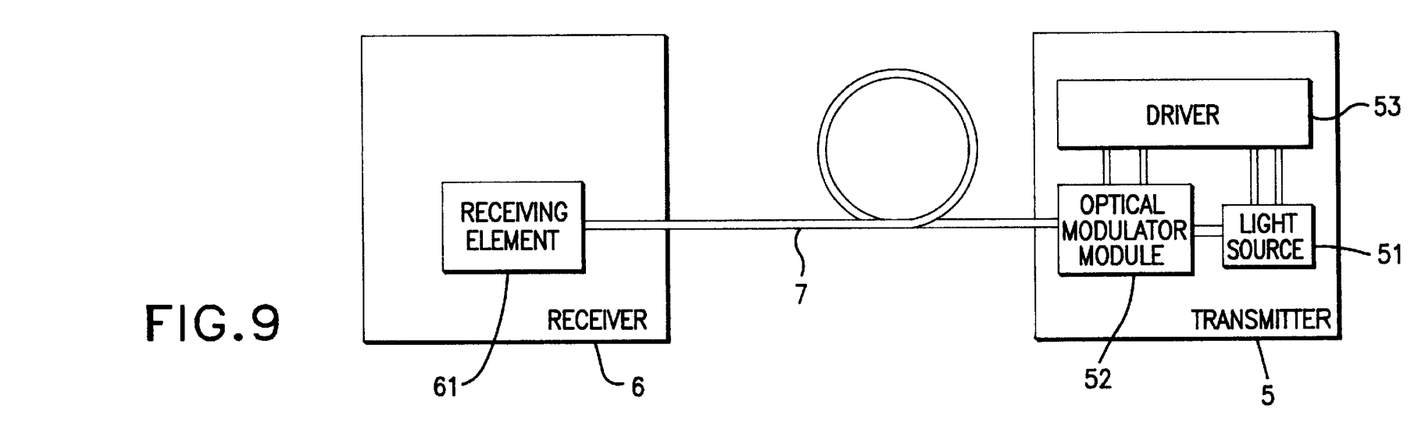
FIG. 9 is a block diagram showing an example of a construction of an optical communication system which employs the optical modulator module shown in FIG. 8.

FIG. 9 is a block diagram showing a construction of an optical communication system which employs the optical modulator module shown in FIG. 8.

Referring to FIG. 9, transmitter 5 includes light source 51 for inputting light to optical modulator module 52, and driver 53 for supplying power to optical modulator module 52 and light source 51.

Meanwhile, receiver 6 includes receiving element 61 for receiving an optical signal, and optical modulator module 52 of transmitter 5 and receiving element 61 of receiver 6 are connected to each other by optical fiber 7.

In the optical communication system having the construction described above, light outputted from light source 51 is converted into modulated light by optical modulator module 52 and inputted to receiving element 61 through optical fiber 7.

According to the present embodiment, since a good optical output eye pattern can be obtained, an optical communication system which satisfies an eye mask specification readily can be obtained.

(Fifth Embodiment)

Next, a fifth embodiment of the present invention is described with reference to FIG. 10.

In the present embodiment, a modulator integrated light source wherein the electrical field absorption type optical modulator and a DFB laser are formed on a same substrate is described.

Figure 10:
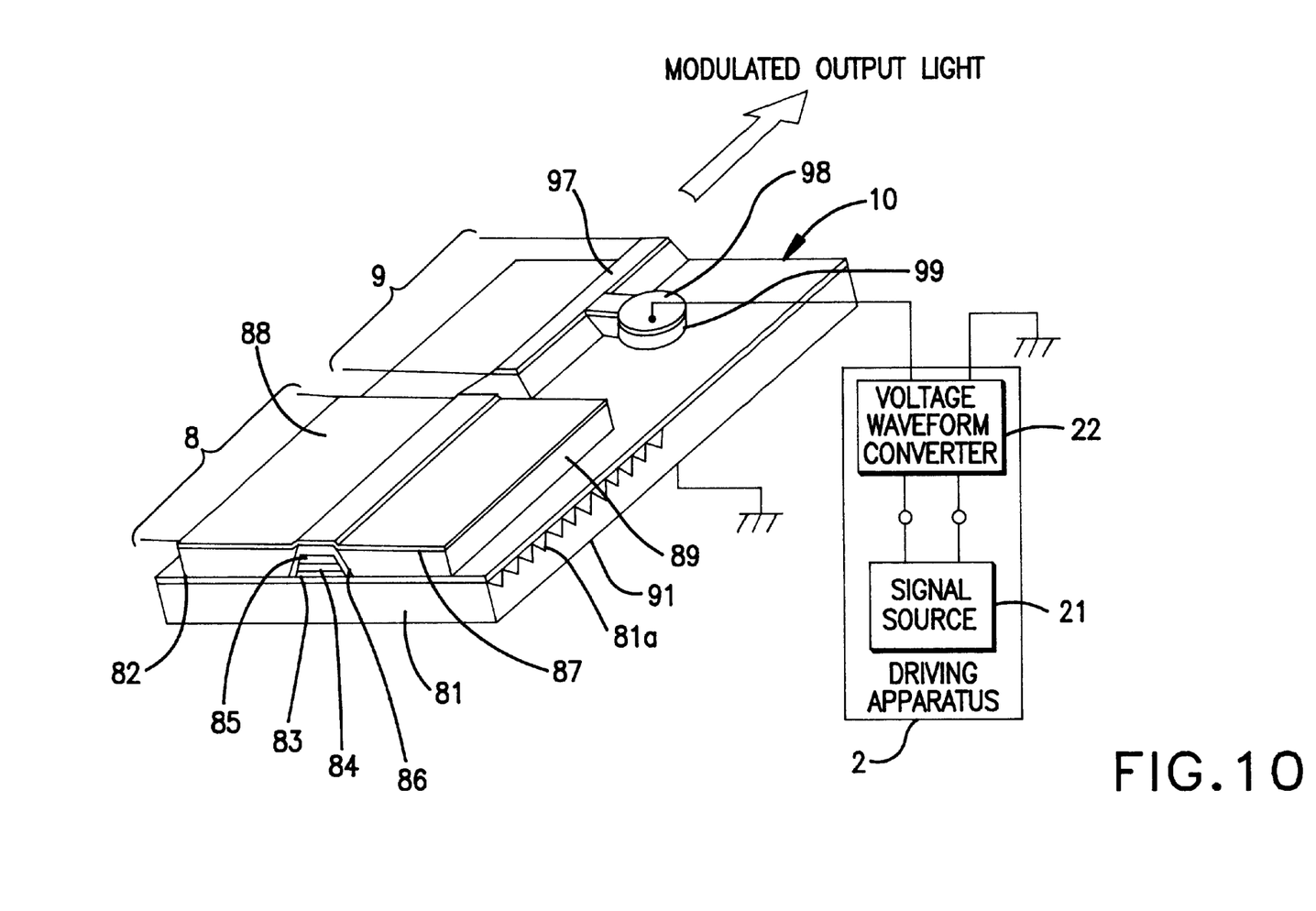
FIG. 10 is a perspective view showing a construction of a modulator integrated light source on which the optical modulator shown in FIG. 3 or 5 and a DFB laser are formed and a block diagram showing a construction of a driving apparatus.

First, a structure of the modulator integrated light source shown in FIG. 10 is described.

Referring to FIG. 10, the modulator integrated light source of the present embodiment includes DFB laser element 8 serving as a light source and optical modulation element 9 for modulating laser light outputted from DFB laser element 8, both formed on n-InP substrate 81 of the (100) crystal orientation.

In the proximity of an upper surface of a location of n-InP substrate 81 at which DFB laser element 8 is formed, diffraction grating 81$a$ which determines the wavelength of laser light to be outputted is formed, and on n-InP substrate 81, n-InP buffer layer 82 (film thickness: 0.8 μm, carrier concentration: $1\times10^{17}$ cm$^{-3}$) is layered. On n-InP buffer layer 82, n-InP clad layer 83 (film thickness: 700 Å, carrier concentration: $1\times10^{17}$ cm$^{-3}$) for confining input light in a horizontal direction, MQW active layer 84 (InGaAsP/InGaAsP eight periods) for outputting light, and p-InP clad layer 85 (film thickness: 1,600 Å, carrier concentration: $5\times10^{17}$ cm$^{-3}$) for confining light waves in a horizontal direction are successively layered. n-InP clad layer 83, MQW active layer 84 and p-InP clad layer 85 are covered with p clad layer 86 (film thickness: 1.6 μm, carrier concentration: $5\times10^{17}$ cm$^{-3}$). Further, p-InGaAs cap layer 87 (film thickness: 0.25 μm, carrier concentration: $1\times10^{19}$ cm$^{-3}$ is formed on p clad layer 83, and first polyimide film 89 is formed below p-InGaAs cap layer 87 except p clad layer 86.

Here, MQW active layer 84 is formed on a region in which diffraction grating 81$b$ is formed by a selective MOVPE (metal organic vapor phase epitaxy) band gap control technique so that the wavelength composition may be 1.55 μm, thereby forming DFB laser element 8 serving as a light source. Further, in any other region than the region in which diffraction grating 81$b$ is formed, MQW active layer 84 is formed so that the wavelength composition may be 1.49 μm, and this functions as an MQW light absorption layer, thereby forming optical modulation element 9.

First p-side electrode 88 made of Cr/Au is formed on p-InGaAs cap layer 87 of DFB laser element 8 while second p-side electrode 97 is formed on the p-InGaAs cap layer of optical modulation element 9 similarly. Further, pad electrode 98 is connected to second p-side electrode 97, and second polyimide film 99 is formed below pad electrode 98. Further, n-side electrode 91 made of Cr/Au is formed on the rear surface of n-InP substrate 81.

It is to be noted that a non-reflective coating film is applied to cleavage end surfaces of modulator integrated light source 10 which are an outgoing surface of modulated light and the opposite surface.

In the modulator integrated light source having the construction described above, if a dc voltage is applied between first p-side electrode 88 and n-side electrode 91, then continuously oscillated laser light is obtained from DFB laser element 8, and the laser light is introduced into optical modulation element 9.

Meanwhile, driving apparatus 2 includes signal source 21 for outputting a pulse signal as a modulation signal and voltage waveform converter 22 for deforming the signal outputted from signal source 21, similarly as in the first embodiment. A signal outputted from voltage waveform converter 22 is applied between pad electrode 98 and n-side electrode 91 of modulator integrated light source 10.

Accordingly, similarly as in the first embodiment, by deforming a signal voltage by voltage waveform converter 22 so that the non-linearity of the quenching characteristics of optical modulation element 9 may be corrected, the non-linearity of the quenching characteristics of optical modulation element 9 of the electrical field absorption type is corrected, and a good eye pattern of modulated output light with displacement of a cross point of the modulated output light corrected. It is to be noted that the driving apparatus may have a construction which includes a bias Tee circuit similarly as in the second embodiment. Also in this instance, displacement of a cross point of an eye pattern of modulated output light is corrected and a good eye pattern can be obtained similarly as in the second embodiment.

While a preferred embodiments of the present invention have been described using specific terms, such description is for illustrative purposes only, and it is to be understood that changes and variations may be made without departing from the spirit or scope of the following claims.

What is claimed is:

1. A driving apparatus for causing an optical modulator to output modulated light, the optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in the light absorption layer are successively layered on a semiconductor substrate such that an absorbed amount of the light waves inputted to the light absorption layer varies in response to an applied voltage applied in the reverse direction to said PIN structure, said driving apparatus comprising:

a voltage waveform converter for deforming a signal waveform inputted thereto so as to displace a cross point of an eve pattern of a modulated light outputted from the optical modulator toward a light-on side from a liqht-off side to correct the non-linear characteristics of the absorbed amount of light with respect to the applied voltage of the optical modulator and outputting the deformed signal waveform to the optical modulator.

2. A driving apparatus for causing an optical modulator to output modulated light, the optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in the light absorption layer are successively layered on a semiconductor substrate such that an absorbed amount of the light waves inputted to the light absorption layer varies in response to an applied voltage applied in the reverse direction to said PIN structure, said driving apparatus comprising:

a level shifting circuit for shifting a voltage level of a signal inputted thereto to a forward voltage region of the PIN structure within a built-in voltage.

3. The driving apparatus as claimed in claim 2, wherein said level shifting circuit is a bias Tee circuit which comprises:

a variable voltage source for variably outputting a dc voltage for determining a shift amount into the forward voltage region;

a capacitor for preventing a dc component outputted from said variable voltage source from having an influence on a signal source which outputs the signal; and an inductance for preventing an ac component outputted from said signal source from having an influence on said variable voltage source.

4. An optical communication module, comprising:

an optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in said light absorption layer are successively layered on a semiconductor substrate such that an absorbed amount of the light waves inputted to said light absorption layer varies in response to an applied voltage applied in the reverse direction to said PIN structure;

first condensing means for introducing light waves into an end of said light absorption layer;

second condensing means for introducing light waves outputted from the other end of said light absorption layer into an optical transmission line; and a voltage waveform converter for deforming a signal waveform inputted thereto so as to displace a cross point of an eye pattern of a modulated light outputted from the optical modulator toward a light-on side from a light-off side to correct the non-linear characteristics of the absorbed amount of light with respect to the applied voltage of said optical modulator.

5. An optical communication module, comprising:

an optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in said light absorption layer are successively layered on a semiconductor substrate such that an absorbed amount of the light waves inputted to said light absorption layer varies in response to an applied voltage applied in the reverse direction to said PIN structure;

first condensing means for introducing light waves into an end of said light absorption layer;

second condensing means for introducing light waves outputted from the other end of said light absorption layer into an optical transmission line; and a level shifting circuit for shifting a voltage level of a signal inputted thereto by a shift amount to a forward voltage region of said PIN structure within a built-in voltage so as to bias an applied voltage region of said PIN structure by the shift amount into the forward voltage region.

6. The optical communication module as claimed in claim 5, wherein said level shifting circuit is a bias Tee circuit which comprises:

a variable voltage source for variably outputting a dc voltage for determining the shift amount;

a capacitor for preventing a dc component outputted from said variable voltage source from having an influence on a signal source which outputs the signal; and an inductance for preventing an ac component outputted from said signal source from having an influence on said variable voltage source.

7. An optical communication system, comprising:

a transmitter including an optical communication module as claimed in claim 4;

an optical transmission line for transmitting light waves outputted from said transmitter; and a receiver for receiving the light waves to reproduce a signal.

8. An optical communication system, comprising:

a transmitter including an optical communication module as claimed in claim 5;

an optical transmission line for transmitting light waves outputted from said transmitter; and a receiver for receiving the light waves to reproduce a signal.

9. An optical communication system, comprising:
a transmitter including an optical communication module as claimed in claim 6;
an optical transmission line for transmitting light waves outputted from said transmitter; and
a receiver for receiving the light waves to reproduce a signal.

10. A driving apparatus for causing a modulator integrated light source to output modulated light, the modulator integrated light source including:

an optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in the light absorption layer are successively layered on a semiconductor substrate such that an absorbed amount of the light waves inputted to the light absorption layer varies in response to an applied voltage applied in the reverse direction to said PIN structure; and a semiconductor laser formed on the semiconductor substrate and serving as a light source for the light waves to be inputted to the optical modulator, said driving apparatus comprising:

a voltage waveform converter for deforming a signal waveform inputted thereto so as to displace a cross point of an eye pattern of a modulated light outputted from the optical modulator toward a light-on side from a liqht-off side to correct the non-linear characteristics of the absorbed amount of light with respect to the applied voltage of the optical modulator and outputting the deformed signal waveform to the optical modulator.

11. A driving apparatus for causing a modulator integrated light source to output modulated light, the modulator integrated light source including:

an optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in the light absorption layer are successively layered on a semiconductor substrate such that an absorbed amount of the light waves inputted to the light absorption layer varies in response to an applied voltage applied in the reverse direction to said PIN structure; and a semiconductor laser formed on the semiconductor substrate and serving as a light source for the light waves to be inputted to the optical modulator, said driving apparatus comprising:

a level shifting circuit for shifting a voltage level of a signal inputted thereto to a forward voltage region of the PIN structure within a built-in voltage.

12. The driving apparatus as claimed in claim 11, wherein said level shifting circuit is a bias Tee circuit which comprises:

a variable voltage source for variably outputting a dc voltage for determining a shift amount into the forward voltage region;

a capacitor for preventing a dc component outputted from said variable voltage source from having an influence on a signal source which outputs the signal; and an inductance for preventing an ac component outputted from said signal source from having an influence on said variable voltage source.

13. An optical communication module, comprising:
a) a modulator integrated light source comprising:
an optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in said light absorption layer are successively layered on a semiconductor substrate such that an absorbed amount of the light waves inputted to said light absorption layer varies in response to an applied voltage applied in the reverse direction to said PIN structure; and a semiconductor laser formed on said semiconductor substrate and serving as a light source for the light waves to be inputted to said optical modulator;

b) condensing means for introducing light waves outputted from the other end of said light absorption layer into an external optical transmission line; and c) a voltage waveform converter for deforming a signal waveform inputted thereto so as to displace a cross point of an eye pattern of a modulated light outputted from the optical modulator toward a light-on side from a light-off side to correct the non-linear characteristics of the absorbed amount of light with respect to the applied voltage of said optical modulator.

14. An optical communication module, comprising:
a) a modulator integrated light source comprising:
an optical modulator having a PIN structure wherein a buffer layer made of an n-type semiconductor, a light absorption layer for absorbing light waves inputted from one end thereof and outputting the remaining light waves from the other end thereof, and a clad layer made of a p-type semiconductor for confining the light waves in said light absorption layer are successively layered on a semiconductor substrate such that an absorbed amount of the light waves inputted to said light absorption layer varies in response to an applied voltage applied in the reverse direction to said PIN structure; and a semiconductor laser formed on said semiconductor substrate and serving as a light source for the light waves to be inputted to said optical modulator;

b) condensing means for introducing light waves outputted from the other end of said light absorption layer into an optical transmission line; and c) a level shifting circuit for shifting a voltage level of an inputted signal to a forward voltage region of said PIN structure within a built-in voltage.

15. The optical communication module as claimed in claim 14, wherein said level shifting circuit is a bias Tee circuit which comprises:

a variable voltage source for variably outputting a dc voltage for determining a shift amount into the forward voltage region;

a capacitor for preventing a dc component outputted from said variable voltage source from having an influence on a signal source which outputs the signal; and an inductance for preventing an ac component outputted from said signal source from having an influence on said variable voltage source.

16. An optical communication system, comprising:

a transmitter including an optical communication module as claimed in claim 13;

an optical transmission line for transmitting light waves outputted from said transmitter; and a receiver for receiving the light waves to reproduce a signal.

17. An optical communication system, comprising:

a transmitter including an optical communication module as claimed in claim 14;

an optical transmission line for transmitting light waves outputted from said transmitter; and a receiver for receiving the light waves to reproduce a signal.

18. An optical communication system, comprising:

a transmitter including an optical communication module as claimed in claim 15;

an optical transmission line for transmitting light waves outputted from said transmitter; and a receiver for receiving the light waves to reproduce a signal.

* * * * *